United States Patent
Calvez (10) Patent No.: US 7,925,490 B2
(45) Date of Patent: Apr. 12, 2011

(54) METHOD OF TRANSACTIONAL SIMULATION OF A GENERIC COMMUNICATION NODE MODEL, AND THE CORRESPONDING COMPUTER PROGRAM PRODUCT AND STORAGE MEANS

(75) Inventor: Jean-Paul Calvez, La Chapelle sur Erdre (FR)

(73) Assignee: Cofluent Design, Nantes (FR)

( * ) Notice: Subject to any disclaimer, the term of this patent is extended or adjusted under 35 U.S.C. 154(b) by 486 days.

(21) Appl. No.: 12/059,310

(22) Filed: Mar. 31, 2008

(65) Prior Publication Data

US 2008/0243464 A1    Oct. 2, 2008

(30) Foreign Application Priority Data

Mar. 30, 2007   (FR) ...................................... 07 02376

(51) Int. Cl.
  *G06G 7/62*    (2006.01)
(52) U.S. Cl. ......................................... 703/17; 709/224
(58) Field of Classification Search ...................... 703/17
   See application file for complete search history.

(56) References Cited

U.S. PATENT DOCUMENTS 7,734,775 B2 * 6/2010 Barnett et al. ................. 709/224
7,778,815 B2 * 8/2010 Pasricha et al. ................. 703/22

OTHER PUBLICATIONS

Moigne et al, "An Abstract Communication Bus Model for Performance Estimation in SoCs with System C", FDL 04, Sep. 2004.*
Koegel et al, "A Modular Simulation Framework for Architectural Exploration of On-Chip Interconnection Networks", Codes-ISSS'03, Oct. 1-3, 2003.*
Beigne et al, "An Asynchronous Architecture Providing Low Latency Service and its Multi-Level Design Framework", Proceedings of the 11th IEEE International Symposium on Asynchronous Circuits and Systems, 2005.*
Caldari et al, "Transaction-Level Methods for AMBA Bus Architecture Using SystemC 2.0", Proceedings of the Design Automation and Test in Europe Conference and Exhibition, 2003.*
Yoon et al, "Case Study on Transaction Level Modeling of NoC based IEEE 802.11n", Asia-Pacific Conference on Communications, Aug. 31-Sep. 1, 2006.*
"Transaction level modelling of IEEE 802.11 System" (Jin Lee, et al) May 23, 2005.
French search report of application No. 07/02376 filed Mar. 30, 2007.

* cited by examiner

*Primary Examiner* — Mary C Jacob
(74) *Attorney, Agent, or Firm* — David D. Brush; Westman, Champlin & Kelly, P.A.

(57) ABSTRACT

A method of transactional simulation of a generic communication node model is proposed. The method includes steps, performed at each simulation step corresponding to transaction start events and transaction end events, including: calculating a remaining quantity of data to be transmitted for each transaction not completed in a list of current transactions; if the simulation step corresponds to the start of a new transaction, calculating a quantity of data to be transmitted for the new transaction and adding the new transaction to the list of current transaction; if the simulation step corresponds to the end of the transaction, removing the transaction from the list of current transactions; allocating throughputs to the current transactions, according to a predetermined node sharing policy; calculating a duration up to the closest end time of one of the current transactions; and assigning a wait for the duration before generation of the next transaction end event.

10 Claims, 7 Drawing Sheets

METHOD OF TRANSACTIONAL SIMULATION OF A GENERIC COMMUNICATION NODE MODEL, AND THE CORRESPONDING COMPUTER PROGRAM PRODUCT AND STORAGE MEANS

CROSS-REFERENCE TO RELATED APPLICATIONS

None.

FIELD OF THE DISCLOSURE

The field of the disclosure is that of complex systems of the type comprising a plurality of constituents, such as for example one or more processors executing a set of functions.

Processor means in the present document any execution resource unit. The disclosure is not limited solely to software and hardware processors used in electronic and computing systems but applies also to mechanical processors (for example a robot executing one or more tasks) or human processors (for example an operator executing one or more tasks).

These complex systems make it possible in particular, but not exclusively, to make computer programs, also referred to as applications or software, function.

More precisely, the disclosure concerns a technique for the transactional simulation of a generic communication node model included in a complex system model. The generic node model manages transactions between constituents of the complex system model.

The technique of the disclosure has been developed for the design and exploration of architectures of complex embedded electronic systems, whether it is a case of cards or systems integrated in a chip (or SoC, for "System on Chip"). These systems routinely integrate hardware and software as execution resources for the services. These resources are generally interconnected by buses and more and more by interconnection networks (referred to as "interconnects").

However, because the technology of the disclosure is based on general concepts of constituents (such as tasks, (functions) and processors (and therefore execution resources)), they have a wider application than that of microprocessors. It covers every type of processor (see the definition above) that is to share resources.

The technique of the disclosure sets out to be particularly adapted to new telecommunication and multimedia technologies. The changes in customer requirements, standards of data, voice and video processing and communications lead to having to create upgradeable equipment more and more including parallelism of functions and communications.

In electronic and computer systems, the complex systems are implemented by assembling hardware components: standard processors (or CPUs, for "central processing units"), microprocessors (or MCUs, for "microcontroller units"), signal processing processors (or DSPs, for "digital signal processors"), application specific integrated circuits (or ASICs, for "application-specific integrated circuits"), programmable logic arrays (in particular pre-diffused programmable arrays (or FPGAs, for "field programmable gate arrays") and memories, thus constituting the hardware platform of the system. They have added to this hardware platform a set of software developed for each software processor (CPU, MCU, DSP), as well as the configuration of the hardware processors (ASICs, FPGAs). All these constituents (hardware and software) once integrated (trend towards systems on silicon—"system-on-chip") constitute a complex system whose detailed behavior it is almost impossible to predict, along with certain properties, such as their performance.

The design of complex systems is an activity upstream of production, integration and testing, which requires on the part of engineers that they should very early on predict the properties of the system to be developed in order to verify all the characteristics of the constituents.

With the increase in complexity and the reduction in development time, the designers must have available models, methods and design assistance tools (CAD—computer aided design). The technology of the invention meets such a requirement.

The prediction of the properties of such systems in terms of functionalities and performance in the general sense generally results in the simulation of abstract models best representing the complex electronic systems able to mix hardware processors (FPGAs, ASICs) and software processors (CPUs, MCUs, DSPs). The very nature of current electronic systems and those of the future, which result from the integration of real-time software executed on one or more processors themselves coupled with a complex and very varied hardware environment, results in having to have available effective and high-performance modeling techniques to verify and validate the solutions as effectively and as soon as possible during their design. For this reason, the modeling technologies with a view to simulation are very critical for the industry of computer aided electronic design (or EDA, for "electronic design automation").

BACKGROUND OF THE DISCLOSURE

A brief panorama of the prior art concerning the techniques of simulating a generic communication node model included in a complex system model is set out below.

It will be recalled that a communication node is an essential constituent of current hardware platforms. The bus is the best known type of node and mostly used for interconnecting processors, memories and peripheral components. Bridges and routers are more complex components that we include in the category of communication nodes. In systems integrated on silicon (SoC, for "System on Chip"), the use of interconnection networks (NoC, for "Network on Chip") is found more and more for remedying the limitations of buses.

Figure 1:
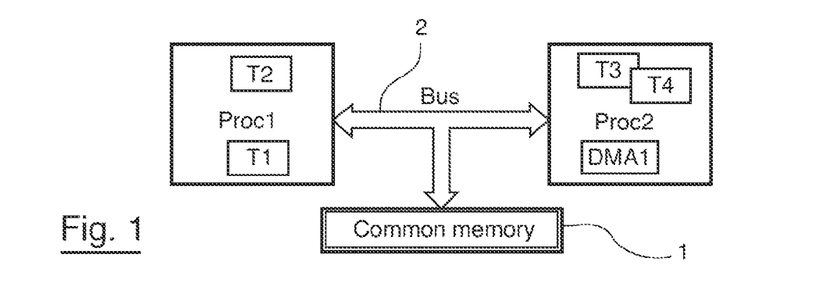
FIG. 1 presents an example of a physical architecture of a complex electronic system comprising a communication node (a bus in this example)

In order to illustrates the interest of techniques of simulating a generic communication node model, we will consider, in relation to FIG. 1, a simple electronic system architecture composed of two processors, Proc1 and Proc2, and a common memory 1, interconnected by a bus 2. A set of tasks is executed by each processor (tasks T1 and T2 for the processor Proc1, tasks T3 and T4 for the processor Proc2). More specific hardware functions such as a direct memory access module (DMA, for "Direct Memory Access") can also exist (module DMA1 for the processor Proc2). The hardware tasks and/or functions exchange data with each other or with the memory by means of the bus. Thus the bus is a critical shared resource that must be managed according to an access policy. The performance properties of the complete system are then very dependent on the behavior of the bus.

Figure 2:
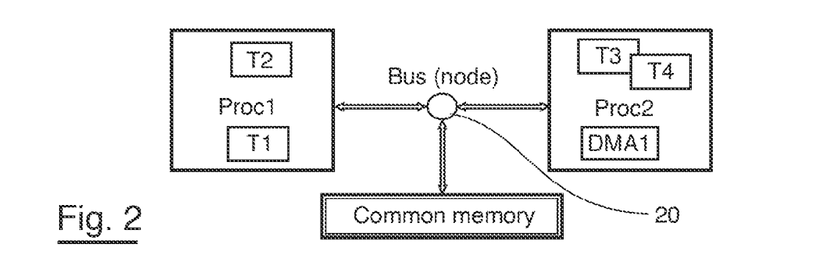
FIG. 2 presents an abstract model of the complex electronic system of FIG. 1 comprising a generic model of the communication node, of which the present disclosure allows a simulation.

This electronic system can be represented by an abstract model given in FIG. 2. The bus is represented by a communication node 20.

Figure 3A:
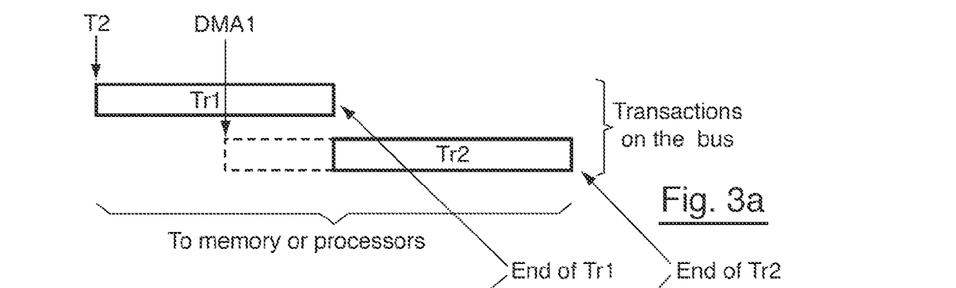
FIGS. 3a, 3b and 3c illustrates three known abstraction levels for the simulation of exchanges provided by a communication node: the "transactional" level (FIG. 3a), the "bus transfer" level (FIG. 3b) and the "clock cycle" level (FIG. 3c)
Figure 3B:
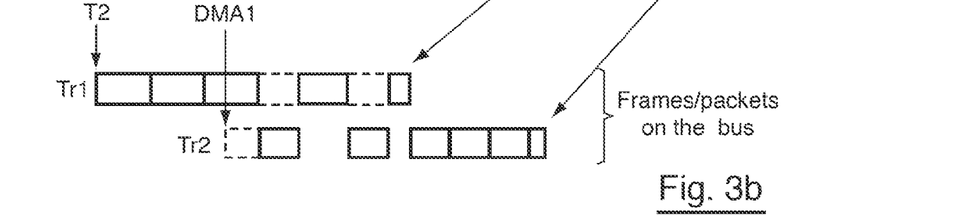
Figure 3C:
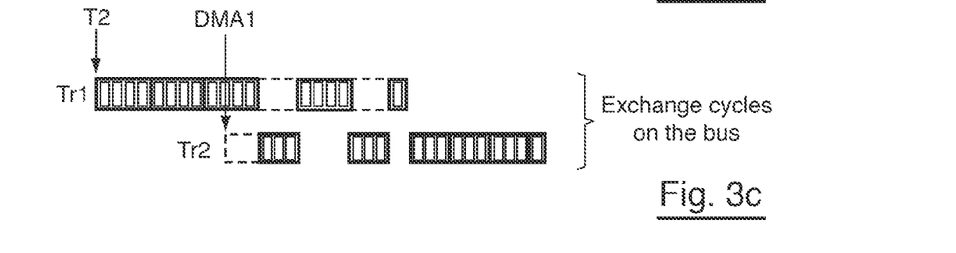

FIGS. 3a, 3b and 3c explain the essential difference between three possible abstraction levels for the simulation of exchanges provided by the bus. We will consider two exchanges arising simultaneously: Tr1 between T2 (Proc1) and the memory, Tr2 between DMA1 (Proc2) and the memory. The two exchanges will use the common bus according to the access policy defined with the essential characteristic for this bus that only one exchange can take place at any one time. Some policies such as interleaving allow alternation between the two exchanges giving an impression of simultaneity.

FIG. 3a illustrates the "transactional" level (or TA, for "Transaction Accurate"), which is the most abstract level. Each exchange is modeled by an atomic transaction. Thus, transaction Tr1 being underway, transaction Tr2 must await the end of transaction Tr1 in order to have the bus available.

FIG. 3b illustrates the "bus transfer" level (or BA, for "Bus Accurate") which is a more detailed level. Each exchange is broken down into a frame or packet of fixed length (except for the last one); "burst" is also spoken of. An interleaving between the two exchanges is then possible, for example by alternating allocation of the bus for a packet of each transaction. In the example, and this is general, it is important to note that the times of the end of the transactions Tr1 and Tr2 differ with respect to those of the transactional level. This implies that the entire simulation that follows differs. Thus the two simulations at the levels TA and BA are not equivalent.

FIG. 3c illustrates the "clock cycle" level (or CA, for "Cycle Accurate"), which is the most detailed level. Each exchange is broken down into a series of clock cycles. Each packet is transmitted as a series of elementary words. Each word requires one or more clock cycles. The first word may require several supplementary access cycles (latency time). A correct temporal parameterising of a model of the level BA may give results similar to its corresponding model CA.

The majority of current solutions for simulating electronic systems including hardware and software come within the category of virtual platforms (first known technique). A virtual platform is a simulation model in which the processors are represented by behavioral models based on the instructions of these processors (or ISS, for "Instruction-Set Simulator"), and the buses, the interconnection networks and the memories are modeled by precise models at the exchange cycle or clock cycle. These models make it possible to have simulation results whose precision is around 95% and 99% with respect to the corresponding real solution. The simulation performance is then situated between 100 K instructions and 5 M instructions according to the technique. The performance is better for BA models but also require the use of ISS models.

Transactional simulation (second known technique) is progressively being used, in particular from the standardization of TLM ("Transaction Level Monitoring"), by the OSCI group (Open SystemC Initiative). The transactional simulation known at the present time (hereinafter referred to as "conventional transactional simulation") considers that each transaction is atomic and therefore does not consider the sharing of a resource such as a bus during simultaneous transactions. The inventor of the present application has no knowledge of existing transactional simulation solutions ensuring the sharing of a bus or interconnection network during simultaneous transactions.

The virtual platform technique (first known technique) has two major drawbacks:

its cost of implementation. This is because it makes it necessary to have available (and therefore purchase or develop) models of processors, buses and memories. It also requires being fairly advanced in the development of the product including the software part since the source software code must be compiled for each target processor to allow its execution by its ISS model. The results obtained, even if they are very precise, arrive very late in the development process, especially well after all the decisions have been taken. The results are said to be of a confirmative nature in contradistinction to prospective results sought by system architects;

the duration of simulation. With the increase in complexity, the simulation times become prohibitive, in particular during the initial phases of exploration of the potential architecture, when it is a case of making a maximum number of iterations for making decisions correctly. Acceleration factors of 100 to 10,000 are required, which can be achieved only by transactional simulation.

The conventional transactional simulation technique (second known technique) makes it possible to mitigate the aforementioned two drawbacks of the virtual platform technique, by virtue of the following characteristics: use of generic models of components, models of software tasks and hardware functions described in SystemC, acceleration factor of the simulation of 1000 to 10000 with respect to models of the clock cycle level.

However, the conventional transactional simulation technique does not provide precise results since the atomic exchanges introduce significant temporal distortions. The influence of these distortions is greater or lesser according to the fields of application. The systems in the telecommunications and multimedia field are very demanding on the use of resources of the bus, network and memory type, with high real-time constraints. Thus the performance evaluated may prove to be very erroneous.

SUMMARY

An aspect of the present disclosure relates to a method of transactional simulation of a generic communication node model included in a complex system model, said generic node model managing transactions between constituents of said complex system model, said method comprising the following steps, performed at each simulation step corresponding to an event belonging to the group of events comprising transaction starts and transaction ends.

calculating a remaining quantity of data to be transmitted for each transaction not completed present in a list of current transactions;

if said simulation step corresponds to the start of a new transaction, calculating a quantity of data to be transmitted for the new transaction and adding the new transaction to a list of current transactions;

if said simulation step corresponds to the end of the transaction, removing the transaction from the list of current transactions;

allocating throughputs to the current transactions, according to a predetermined policy of sharing the node;

calculating a duration $TpsRk$ up to the closest moment of ending one of the current transactions: $TpsRk=MIN(TpsRi)$, with $TpsRi=Qri/Di$, $TpsRi$ being the duration up to the time of end of a current transaction $i$, $Qri$ the quantity of data remaining from the transaction $i$ and $Di$ the throughput allocated to the transaction $i$;

assigning a waiting for said duration $TpsRk$ before the next end of transaction event is generated.

Thus, this particular embodiment is based on an entirely novel and inventive approach of using a transactional simulation technique optimized compared with the conventional transactional simulation technique. It is based on an event simulation of transactions, determining solely useful future moments (transaction ends) of the model of the node on the basis of calculations of remaining quantities of data to be transferred for each non-completed transaction. In other words, the technique proposed makes it possible to obtain, with a simulation of the transactional level (TA), results identical to the more detailed lower levels (BA or CA) but much more quickly by virtue of the reduction of simulation events.

In addition, like the conventional simulation technique, the transactional simulation technique of this embodiment mitigates the aforementioned two drawbacks of the virtual platform technique.

With the increase in the complexity of the system models, the technique of this embodiment is particularly adapted for the verification by simulation of the complex systems and the exploration of possible architectures.

Advantageously, the step of allocating throughputs to the current transactions is a step of direct allocation of throughputs.

In other words, the throughputs are calculated directly according to the node sharing policy.

According to an advantageous variant, the step of allocating throughputs to the current transactions is a step of indirect throughput allocation comprising the following steps:

allocation to the current transactions, according to said predetermined node sharing policy, of percentages of a maximum throughput MaxThroughput of the generic node model;

calculating the throughputs allocated to the current transactions by applying the following formula: $D_i$=MaxThroughput*$R_i$, with $R_i$ the percentage of the throughput allocated to the transaction i.

In other words, percentages of the maximum throughput are first of all calculated, according to the node sharing policy, and then the throughputs are calculated.

In a particular embodiment, the policy of sharing the predetermined node belongs to the group comprising:

a policy of allocation by egalitarian interleaving, such that all the values $D_i$ are equal to MaxThroughput/N, with MaxThroughput the maximum throughput of the generic node model and N the number of current transactions;

a policy of allocation by priority, such that: $D_i$=MaxThroughput for the transaction i with the highest priority, and: $D_i$=0 for the other transactions;

an allocation policy of the "first in first out" (FIFO) type, such that: $D_i$=MaxThroughput for the oldest transaction, and: $D_i$=0 for the other transactions;

an allocation policy of the quality of service (QoS) type, such that each transaction i is associated with a priority $P_i$ and a requested throughput RequestedThroughput_i, and, in order of decreasing priority, each transaction i is allocated its requested throughput or the remaining throughput if it is less that its requested throughput.

This list of node sharing policies is not exhaustive.

In an advantageous embodiment, said group of events also comprises modifications of a maximum throughput MaxThroughput of the generic node model.

Thus it is considered that the maximum throughput is modifiable, which makes it possible to represent a variable external load.

Advantageously, said complex system is a complex electronic system.

Another embodiment concerns a computer program product downloadable from a communication network and/or recorded on a medium that can be read by a computer and/or executed by a processor, said computer program product comprising program code instructions for the execution of the steps of the aforementioned transactional simulation method (in any one of its embodiments), when said program is executed on a computer.

Another embodiment concerns a storage means, possibly totally or partially removable, able to be read by a computer, storing a set of instructions executable by said computer in order to implement the aforementioned transactional simulation method (in any one of its embodiments).

BRIEF DESCRIPTION OF THE DRAWINGS

Other characteristics and advantages will emerge from reading the following description, given by way of indicative and non-limitative example (all the embodiments of the invention are not limited to the characteristics and advantages of the embodiments described below), and the accompanying drawings, in which.

DETAILED DESCRIPTION OF ILLUSTRATIVE EMBODIMENTS

In all the figures of the present document, identical elements are designated by the same alphanumeric reference.

1. General principle of the disclosure

Obtaining precise results by a transactional simulation requires precisely calculating the start and end of exchange times for each transaction in the model. It is therefore a case, at each event of the simulation (event simulation used), of determining precisely solely the future moments useful for the model.

The original technique of the disclosure is based on a simple method of calculating useful future moments of the communication node. This method stems from an analogy made between the transfer of data by a node (see FIG. 4b) and the flow of water from tanks through valves (see FIG. 4a).

The principle of the disclosure is based on the general equation: Quantity=Throughput×Time. Knowing the quantity and throughput, it is possible to predict the duration of transfer (Time).

Figure 4A:
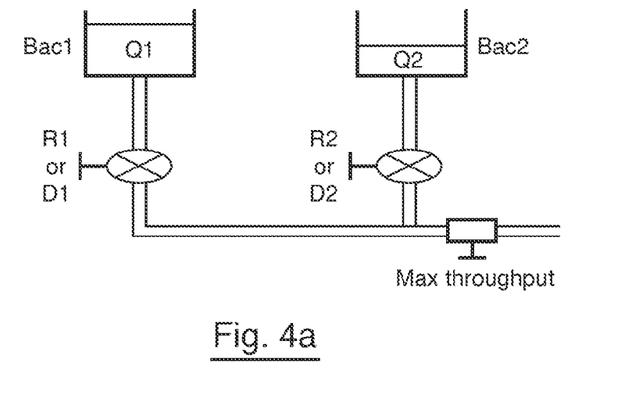
FIGS. 4a and 4b present an analogy between the flow of water from tanks through valves (FIG. 4a) and the transfer of data by a communication node (FIG. 4b), explaining the general principle of the present embodiment.

The analogy with tanks, as illustrated in FIG. 4a, explains the idea. Suppose that at time t1 the tank 1 contains the quantity Q1 of liquid and that at time t2 the tank 2 contains Q2. The two valves discharging from the tanks are adjustable for throughput by R1 and R2. The maximum throughput MaxThroughput at the outlet is defined by an outlet valve modifying the cross-section of the pipe. What concerns us in this analogy are the times T1 and T2 of flow of the quantities Q1 and Q2. These times T1 and T2 are directly related to the throughputs at the outlet of each tank and therefore:
  either absolute throughputs D1 and D2;
  or values R1 and R2 associated with the valves representing the percentage of the maximum throughput. In the case of the percentage, the real throughput for each tank is equal to Di=Ri×MaxThroughput, with 0<Ri<1.

According to the analogy, the size of a transaction expressed in bytes (for example) corresponds to the quantity of liquid. The throughput of the node—the bandwidth of the node is also spoken of—expressed in bytes/second corresponds to the throughput of the pipe. The sharing of the node during simultaneous transactions, and therefore the percentage or the throughput allocated for each of them, corresponds to the adjustment Ri or Di of the valves.

The sum of the Ri values is always less than or equal to 1. When this sum is less than 1 this means that the entire transmission capacity of the node is not used. Thus the node sharing policy can be defined on the basis of the Ri values or the real throughputs Di.

It will also be considered that the maximum throughput MaxThroughput can be modified at any time. This makes it possible to represent a variable external load (for example that of a processor dynamically modifying its activity with the bus to which it is connected).

The transactional simulation technique is based on so-called event simulation. To summarize this principle, at each simulation step (which corresponds to an event), it is a case of updating the list of events in the future according to an increasing order, and then the simulator passes to the future event closest in time, which is therefore the first in the list.

Figure 4B:
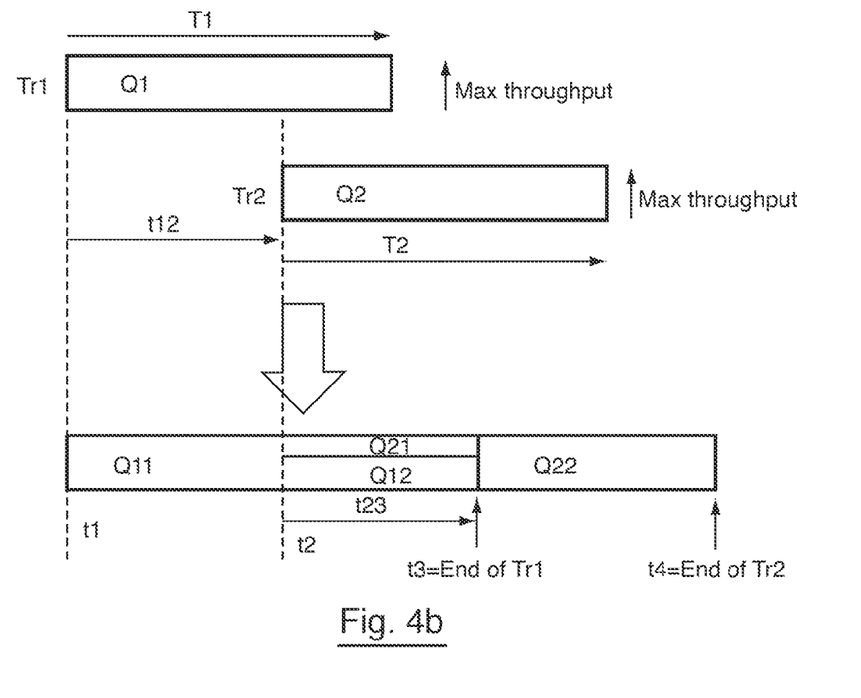

Using this technique to model the transactions on a node, referring to FIG. 4b, it is necessary to consider three types of events for the node; the start of a new transaction, the end of a transaction and the modification of the maximum throughput (MaxThroughput).

Figure 5:
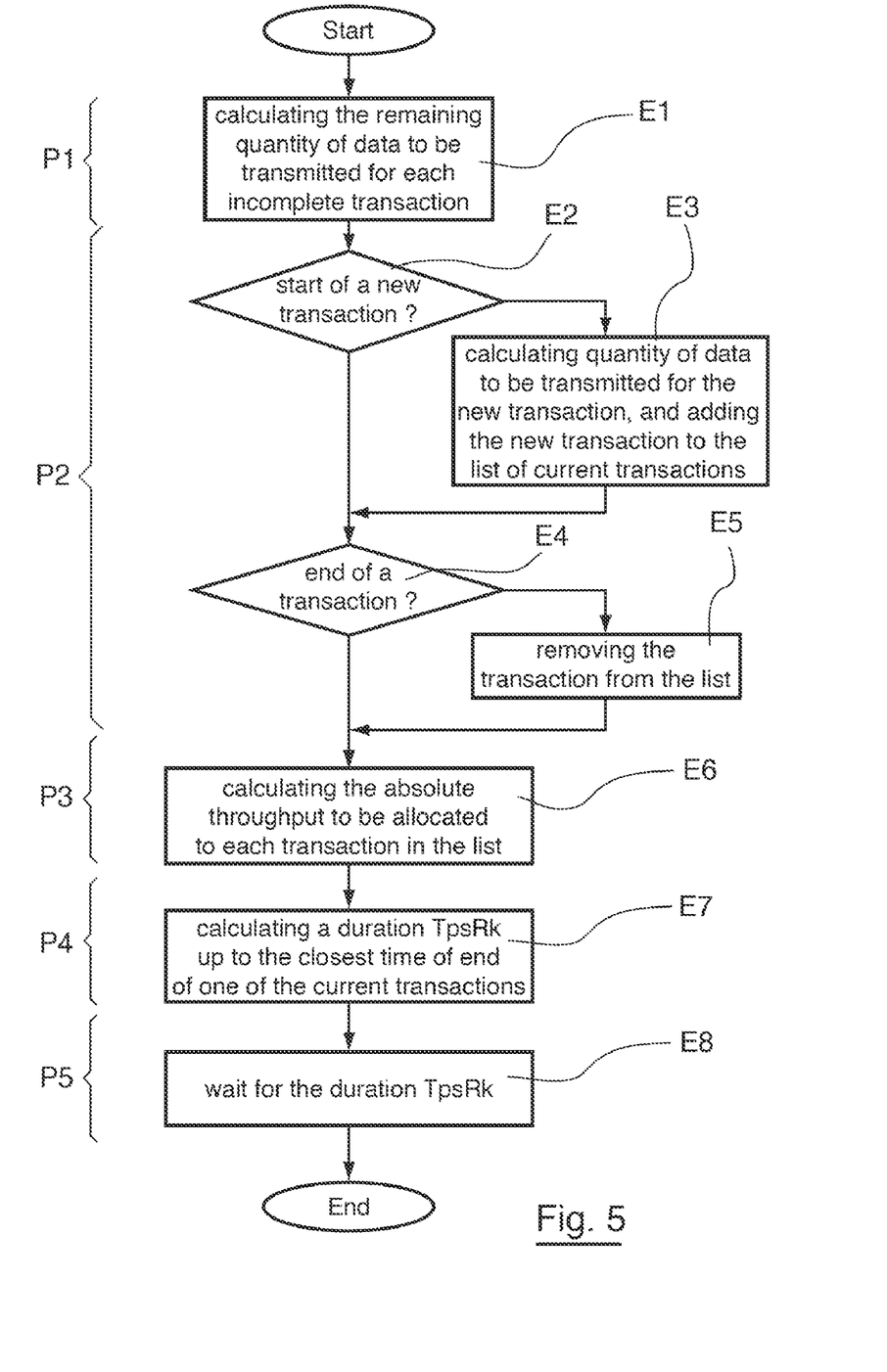
FIG. 5 presents a flow diagram of a particular embodiment of the method.

A particular embodiment of the method according to the disclosure is now presented in relation to the flow diagram in FIG. 5.

The algorithm described below is executed according to five phases (P1 to P5) when each new event out of the aforementioned three types of event appears (that is to say at each simulation step).

First phase P1: in a step E1 the remaining quantity of data to be transmitted for each of the incomplete transactions presented in a list of current transactions is calculated. It is a case of simply subtracting the quantity of data elapsed since the previous execution of the algorithm from the remaining quantity. Taking the example in FIG. 4b:
  at t2 (event: start of the transaction Tr2), there remains the quantity Q12 for the transaction Tr1, with: Q12=Q1−Q11, Q11=t12*MaxThroughput, t12=t2−t1;
  at t3 (event: end of the transaction Tr1), there remains the quantity Q22 for the transaction Tr2, with: Q22=Q2−Q12, Q12=t23*MaxThroughput, t23=t3−t2.

Second phase P2: in a step E2, it is detected whether the new event is the start of a new transaction. In the affirmative, a step E3 of calculating the quantity of data to be transmitted for the new transaction and adding the new transaction to the list of current transactions is performed. Taking the example of FIG. 4b, at t1 (event: start of the transaction Tr1), there is a quantity Q1 to be transmitted for the transaction Tr1. And at t2 (event: start of the transaction Tr2), there is a quantity Q2 for the transaction Tr2. Then, after step E3 (or directly after step E2 in the case of negative detection at step E2), a step E4 is passed to during which it is detected whether the new event is the end of a transaction. In the affirmative, a step E5 of removing the transaction from the list is performed. Taking the example of FIG. 4b, at t3 (event: end of the transaction Tr1), the transaction Tr1 is removed from the list and at T4 (event: end of the transaction Tr2), the transaction Tr2 is removed from the list.

Third phase P3: in a step E6, the absolute throughput Di to be allocated to each transaction i in the list is calculated. In a variant, the percentage Ri of the maximum throughput MaxThroughput to be allocated to each transaction i in the list is first calculated and then the absolute throughput Di to be allocated to each transaction is calculated, knowing that: Di=Ri*MaxThroughput. This direct or indirect calculation of the throughputs Di can be made according to various load sharing policies (see below).

Fourth phase P4: in a step E7, a duration TpsRk up to the closest time of end of one of the current transactions is calculated: TpsRk=MIN(TpsRi), with TpsiRi=Qri/Di, TpsRi being the time remaining for the transaction i (that is to say the duration up to the time of end of this transaction i), Qri the quantity of data remaining for the transaction i and Di the throughput allocated to the transaction i. Taking the example in FIG. 4b, at t2 (event: start of the transaction Tr2), there are calculated:

$$TpsR1 = Q12/D1 - Q12/(\text{MaxThroughput}*R1)$$

$$TpsR2 = Q2/D2 - Q2/(\text{MaxThroughput}*R2)$$

In the example illustrated in FIG. 4b, it is assumed that TpsR1 is less than TpsR2, that is to say that the transaction Tr1 ends before the transaction Tr2. As from t2, the duration up to the closest end time of one of the current transactions is therefore: TpsRk=TpsR1=t23, and the closest end time of one of the current transactions is therefore t3.

Fifth phase P5: in a step E8, a wait for the duration TpsRk before the generation of the next end of transaction event (that is to say before a new execution of the algorithm if no start of new transaction event or change of maximum throughput occurs in the meantime) is assigned.

In summary, with the example in FIG. 4b, the five-phase algorithm is executed only four times, during the following four events: start of the transaction Tr1 (at t1), start of the transaction Tr2 (at t2), end of the transaction Tr1 (at t3) and end of the transaction Tr2 (at t4). Thus, for this example, the efficacy of the technique (measured in number of events) is demonstrated by the fact that only the four events at t1, t2, t3 and t4 are necessary for activation of the algorithm.

This algorithm is parameterized by all the values Di. These values may be fixed or may vary during the development of the model. It is also possible to consider the set Ri as a parameter knowing that Di=MaxThroughput*Ri. These values Di and/or Ri in fact define the bus sharing policy.

All the sharing policies can be implemented by this technique. As non-limitative examples, there can be cited:

egalitarian interleaving policy: the values Di are calculated by MaxThroughput/N, N being the number of current transactions;

priority policy such that: Di=MaxThroughput for the transaction i with the highest priority, and: Di=0 for the other transactions;

a FIFO-type policy, such that: Di=MaxThroughput for the transaction with the highest priority and: Di=0 for the other transactions;

quality of service policy (QoS, for "Quality of Service"): each transaction i is associated with a priority Pi and a requested throughput RequestedThroughput_i. In order of decreasing priority, each transaction i is allocated its requested throughput, or the remaining throughput if it is less than its requested throughput.

Thus all the phases of the above algorithm except for the third phase P3 are independent of the desired allocation policy. Programming by the user is possible, simply by replacement of the processing of the third phase P3.

2. Illustrated detailed description

In the remainder of the description, an example of use of the method according to the disclosure in a new version of the CoFluent Studio Tools® is presented. The various models are shown in accordance with the notations and semantics described in the notations of the MCSE methodology. The algorithms are given for various node access policies.

2.1 Creation of the architectural model

The graphics editor of CoFluent Studio serves to capture the functional models (also called application models) consisting of communicating and competing "functions" having their own behavior and inputs-outputs.

Figure 6:
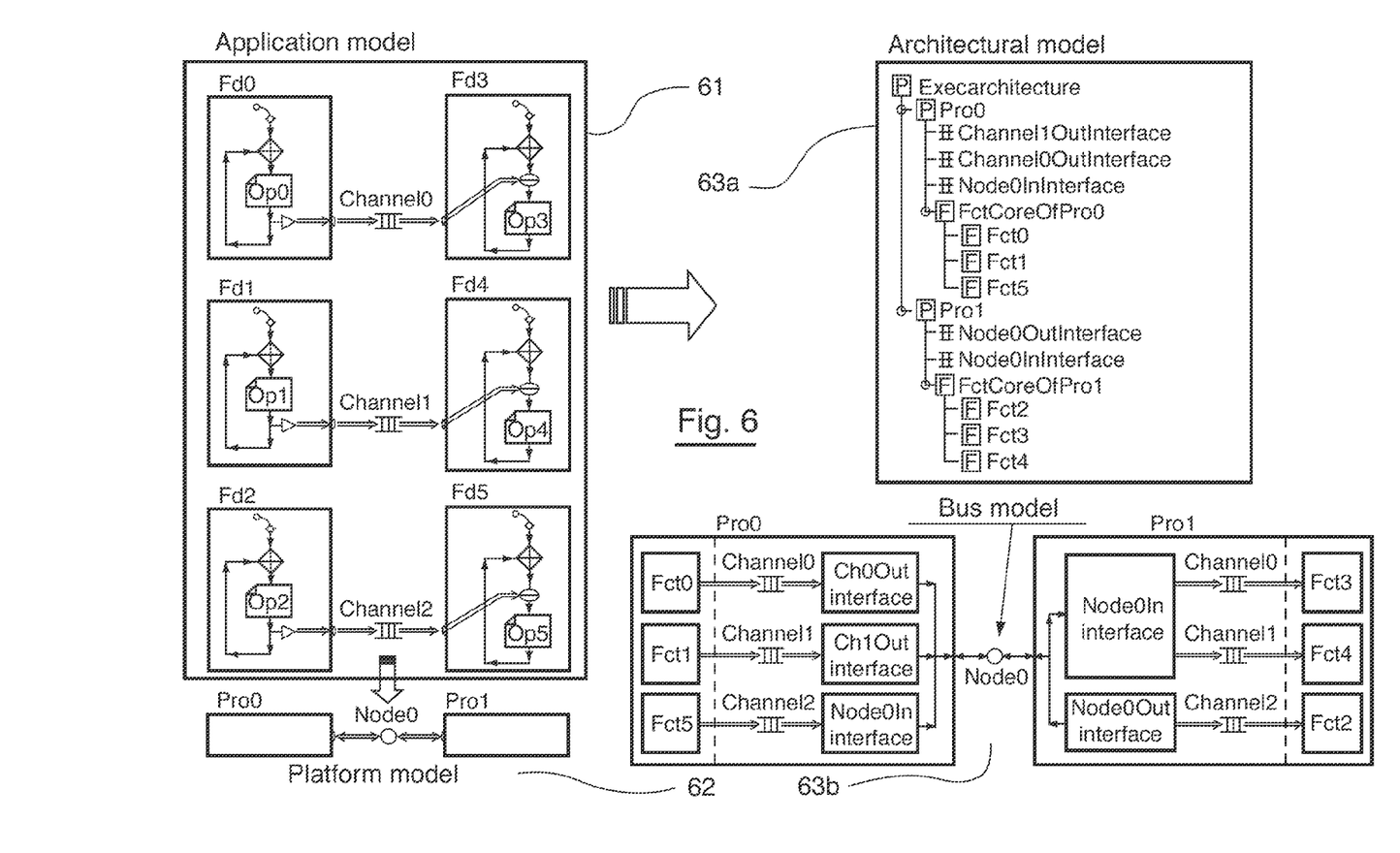
FIG. 6 presents an example of allocation of a functional model to a hardware platform model, for obtaining an architectural model (the latter being presented on one hand in tree form and on the other hand in graphical form)

FIG. 6 depicts an example of allocation of an application model 61 to a hardware platform model 62, making it possible to obtain an architectural model 63a, 63b that it is a case of simulating in order to study its properties. This is presented on the one hand in tree form 63a and on the other hand in graphical form 63b.

In the example of an application model 61 used hereinafter, cyclic functions or tasks exchange messages in pairs:

the functions Fct0 and Fct3, via the channel Channel0;
the functions Fct1 and Fct4, via the channel Channel1;
the functions Fct2 and Fct5, via the channel Channel2.

A message is in fact an atomic transaction containing information and/or data. This application model represents a generation of simultaneous transactions.

The example of a platform model 62 is very simple and comprises two processors Pro0 and Pro1 coupled by a common bus Node0. A memory could be connected to this bus but this is not necessary for the illustration. It suffices simply to think that Pro1 can in fact be a memory.

The architectural model 63a, 63b is obtained by the allocation (or "mapping") of the functions of the application model 61 to the processors of the platform model 62. The result is that the transactions exchanged between the functions by the channels Channel0, Channel1 and Channel2 (duplicated on each processor) must pass through the physical communication node Node0. Interfaces are added to the architectural model in order to model the management of the communications by the node Node0:

interfaces "Ch0OutInterface", "Ch1OutInterface" and "Node0InInterface" in the processor Pro0;
interfaces "Node0InInterface" and "Node0OutInterface" in the processor Pro1.

The node Node0 is here configured as a bus having a throughput of 100 Mbytes/second. The channel Channel0 transfers data of 10000 bytes (that is to say a transaction with a duration of 100 µs on the node Node0). The channel Channel1 transfers 100 bytes (that is to say 1 µs on the node Node0) and the channel Channel2 transfers data of 1000 bytes (that is to say a transaction with a duration of 10 µs on the node Node0).

The choice of the bus sharing policy is made by the attribute "BusAccessPolicy" attached to the node Node0. The modes implemented are for example the aforementioned ones (egalitarian interleaving policy, priority policy, FIFO-type policy and QoS policy). Each of these modes fixes the behaviour for all the transactions submitted to the node.

2.2 Results and solutions for the policy of sharing by egalitarian interleaving

Figure 7:
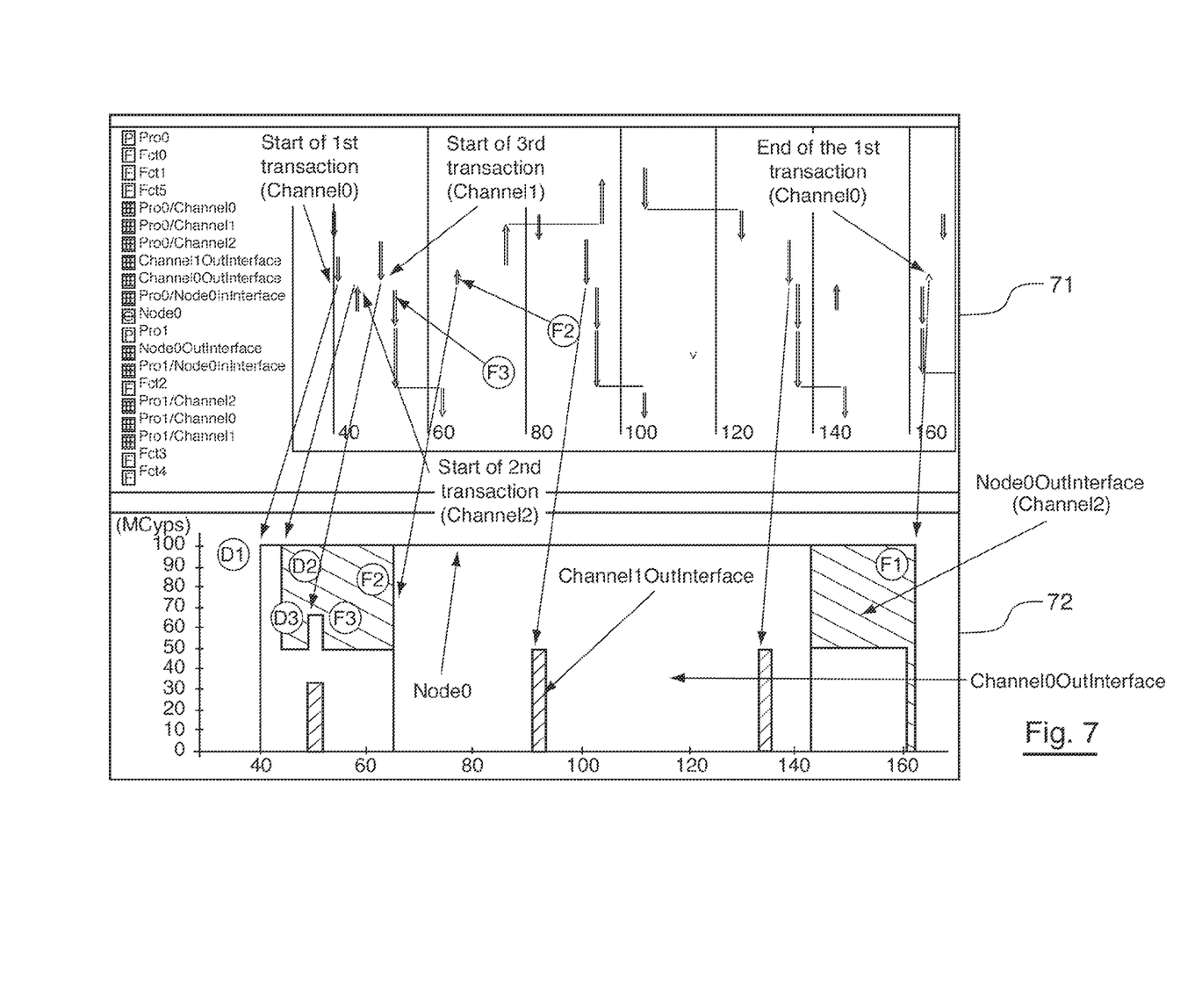
FIG. 7 illustrates a first node sharing policy (by egalitarian interleaving) according to the embodiment, and presenting at the top part an example of a sequence diagram and at the bottom part a graphical representation of the node sharing.

FIG. 7 illustrates a policy of node sharing by egalitarian interleaving, presenting at the top part 71 an example of a sequence diagram and at the bottom part 72 a graphical representation of the node sharing.

The three interfaces Channel0OutInterface, Channel1OutInterface and Node0OutInterface produce transactions on the node Node0 for the exchanges Channel0, Channel1 and Channel2.

The top part 71 of the FIG. 7 shows the result in the form of a timeline derived from the Gantt diagram. The start and end of each transaction on the bus can be observed therein. In particular the simultaneous transfer of the three transactions will be noted.

The bottom part 72 of FIG. 7 is a tool for graphical presentation of the sharing of the bus for the transactions. As from time D1 until D2, the bus is used for the Channel0 transfer through the interface Channel0OutInterface with its maximum use of 100 MCyps (millions of cycles per second).

From time D2 to time D3, the throughput of the bus is distributed between the two transactions Channel0 (through Channel0OutInterface) and Channel2 (through Node0OutInterface). From time D3 to time F3, the throughput is distributed by ⅓ between Channel0 (through Channel0OutInterface), Channel1 (through Channel0Outinterface) and Channel2 (through Node0OutInterface) and so on.

We give below an explanation of the algorithm that produces such a result. Understanding of the algorithm is based on knowledge of the structure of the class of object representing each current transaction. This contains the following fields or members (description in C++ language):

```
Class Transaction (
Transaction* Next;
double TransactionSize;         //Total quantity associated with the transaction
double RemainingTransactionSize;  //Quantity of information remaining to be transmitted
int priority;//Priority associated with the transaction
double RelativeThroughput;      //Weighting factor
double Throughput;              //Throughput associated with the transaction
double AllocatedThroughput      //Throughput allocated to the transaction
double EndDate;                 //Date of the end of transaction event
}
```

The list of current transactions at the end of phase P2 of the algorithm is a list pointed to by pTransactionList, composed of objects corresponding to the class Transaction. The list is formed by the concatenation of the objects by the field Next.

The following match for each transaction i affords understanding of the principle described above:

RemainingTransactionSize=remaining quantity Qi
Relative Throughput=Ri
Throughput=Di requested Allocated Throughput–Di allocated by the sequencing policy EndDate=Current date+TpsRi (then used by the simulator during phase P5)

We give below the algorithm corresponding to phase P3. The algorithm for all the other phases is independent of the required policy.

```
// phase P3 - calculation of the values AllocatedThroughput for all the
current transactions
int NbrTransactions = pTransactionList-
>GetNbOfElement( );// NbrTransactions = number of current transactions
double Throughputi = GetAvailableThroughput( )/NbrTransactions;
while (pTransactionList! = NULL){
    pTransactionList - > Throughput = Throughputi;
    pTransactionList - > AllocatedThroughput = Throughputi;
    pTransactionList = pTransactionList- > Next;
    }
}
```

GetNbOfElement ( ) is a method supplying the number of current transactions (and therefore in the list pointed to by pTransactionList). GetAvailableThroughput ( ) is a method supplying the maximum throughput of the node. Throughputi is the throughput that can be allocated to each transaction. This value is then assigned to each transaction by running through the list.

Phase P4 then uses solely the field AllocatedThroughput for calculating the value and date of each transaction in the list.

2.3 Results and solution for the priority sharing policy

Figure 8:
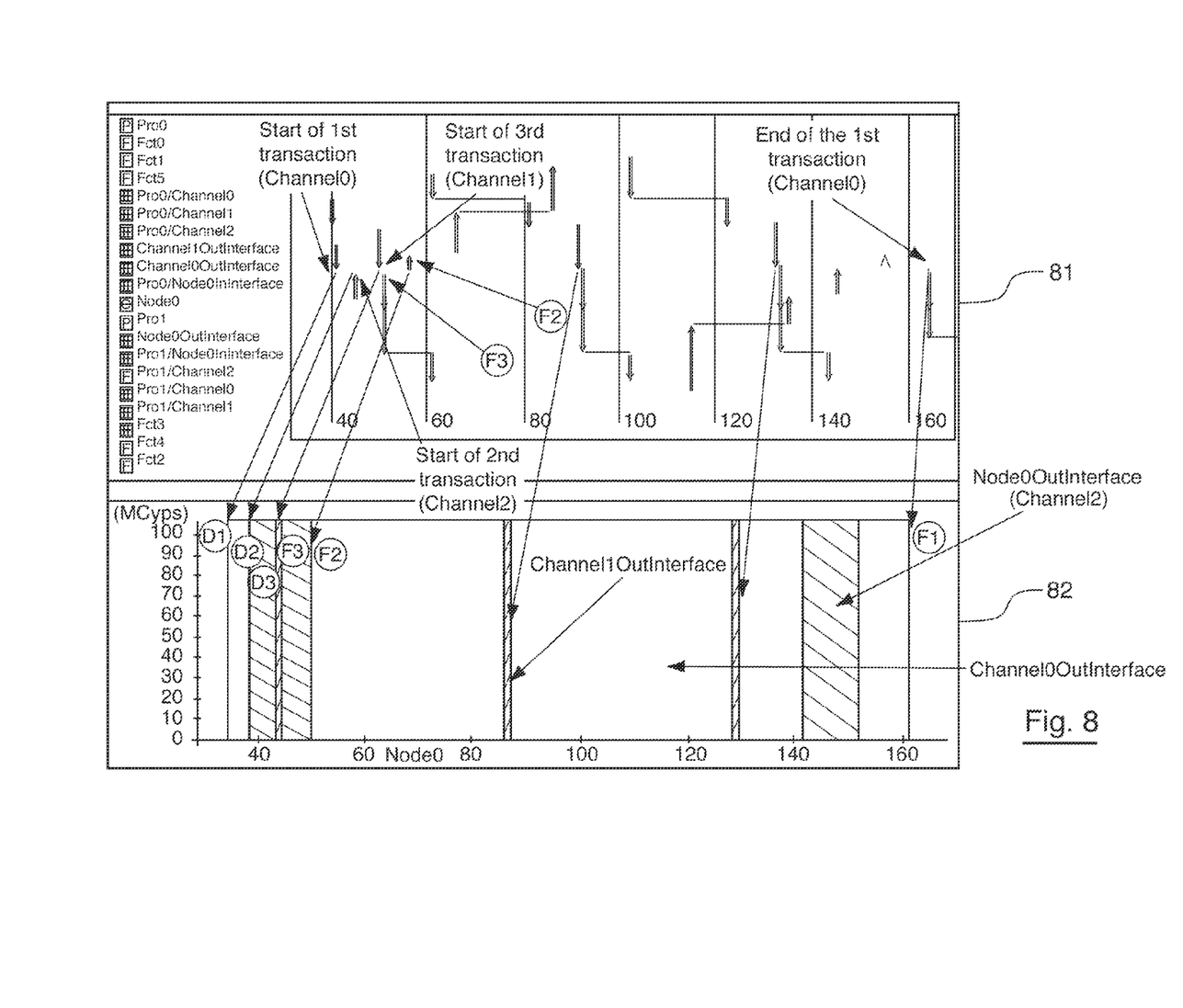
FIG. 8 illustrates a second node sharing policy (by priority) according to the embodiment, presenting at the top part an example of a sequence diagram and at the bottom part a graphical representation of the node sharing.

FIG. 8 illustrates a priority node sharing policy, presenting at the top part 81 an example of a sequence diagram and at the bottom part 82 a graphical representation of the sharing of the node.

The order of priorities is as follows: Channel1>Channel2>Channel0. It can be seen in the sequence diagram that the ends of the transactions Channel1 and Channel2 are not identical to the ends noted for interleaving. The distribution of the throughput of the bus visible on the bottom part 82 shows that only one transaction is active at a time and that the bus is pre-empted by Channel2 initially and then by Channel1.

The algorithm corresponding to phase P3 is given below. It uses the field Priority. This algorithm provides first of all the classification of the transactions in a decreasing order of priority. Next the maximum throughput available is allocated to the transaction with the highest priority. A zero throughput is allocated to all the other transactions.

```
// phase P3 - calculation of the values AllocatedThroughput for all the
current transactions
pTransactionList - > ClassifybyPriority( );// order the list by priority
pTransactionList- > AllocatedThroughput – GetAvailableThroughput( );
pTransactionList – pTransactionList- > Next;
while (pTransactionList! = NULL) {
    pTransactionList- > AllocatedThroughput = 0.0;
    pTransactionList = pTransactionList- > Next;
    }
}
```

2.4 Results and solution for the sharing policy of the QoS type

Figure 9:
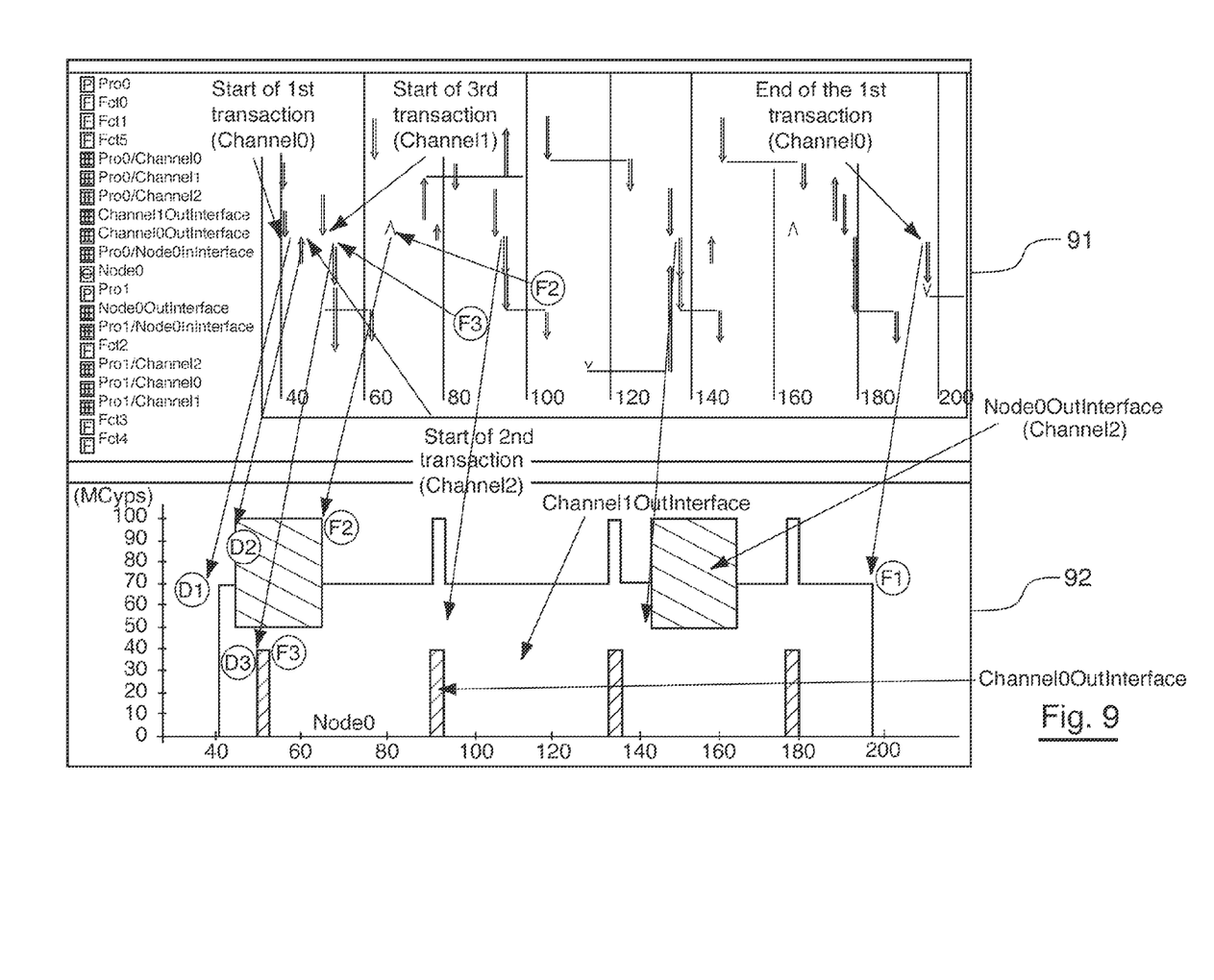
FIG. 9 illustrates a third node sharing policy (of the quality of service type) according to the embodiment, presenting at the top part an example of a sequence diagram and at the bottom part a graphical representation of the node sharing.

FIG. 9 illustrates a node sharing policy in the case of a QoS policy, presenting at the top part 91 an example of a sequence diagram and at the bottom part 92 a graphical representation of the node sharing.

Each transaction is personalized by its priority and by the throughput demanded. The following values are used:

Channel0=>Priority=8, Throughput=70 Mbytes/s
Channel1=>Priority=15, Throughput=40 Mbytes/s
Channel2=>Priority=10, Throughput=50 Mbytes/s As the bus is programmed not to use all its bandwidth (70 Mbytes/s), the transaction with the lowest priority ends later, around 200 µs. The distribution of the throughput according to the priority should be noted between times D3 and F3. Indeed, 10 Mbytes/s remains for Channel0.

The specific programming of each transaction is carried out by one of the following two methods, which must be executed in the primitive sending of a transaction named Send, before the algorithm is called. These two methods serve to create and initialize the object Transaction (and therefore the fields TransactionSize, Priority, RelativeThroughput, Throughput).

SetNodeRequest(TransactionSize, Priority, RelativeThroughput);

SetNodeRequest(TransactionSize, Priority, Throughput, ThroughputUnit);

The algorithm corresponding to phase P3 is given below. It uses the field Priority. This algorithm provides first of all the classification of the transactions in a decreasing order of priority. Next the maximum throughput available is allocated to the transactions with the highest priority and in agreement with the request of each one stipulated in the field Throughput.

```
// phase P3-Calculation of the values AllocatedThroughput for all
the current transactions double RequestedThroughout – 0.0;
int PriorityValue;
float k;
Transaction plist, BeginList;
pTransactionList- > ClassifyByPriority( );// order the list by priority
priority
plist – pTransactionList;
RemainingThroughput - GetAvailableThroughput( );
while (plist! = NULL) {
    PriorityValue = plist- > priority;
    BeginList – plist;
    while ((plist! = NULL) && (plist- > priority == PriorityValue)){
        //make for each priority
        RequestedThroughput + = plist- > Throughput;
        plist- > AllocatedThroughput = plist- > Throughput;
        plist = plist- > Next;
    }
    if (RemainingThroughput > RequestedThroughput){
        RemainingThroughput = RemainingThroughput –
RequestedThroughput;
        RequestedThroughput = 0.0;
    }
    else {
        k = RemainingThroughput/RequestedThroughput;
        plist = BeginList;
        while ((plist! = NULL) && (plist- > priority ==
PriorityValue)){
            plist- > AllocatedThroughput = plist- > Throughput * k;
            plist = plist- > Next;
        }
        while (plist! = NULL){
            plist- > AllocatedThroughput = 0.0;
            plist = plist- > Next;
        }
    }
}
```

The algorithm considers that transactions may have the same priority. Thus the throughput available is then allocated for all the transactions with the same priority. Two cases are presented. The throughput available is sufficient to satisfy the demands for priority, while the rest is considered for the allocation of the transactions with a lower priority. The throughput available is not sufficient, then it is shared proportionately to all the transactions of the priority (coefficient k).

2.5 Programming of the sharing policy by the user

Phase P3 is made programmable (overloaded in the object sense) by the use of the following method. This method is then executed in replacement for the algorithms given above.

```
void UserNodeScheduling(Transaction* pTransactionList)
{
//Part to be defined by the user
}
```

An embodiment of the present disclosure provides a technique of simulating a generic communication node model included in a complex system model, this technique making it possible to minimize the number of simulation events necessary with respect to the conventional transactional simulation discussed above, while producing precise results relative to the real system that the model represents.

Another embodiment of the disclosure provides such a technique applying to any hardware architecture configuration or any task or function configuration on processors, whatever the exchange is between the constituents by means of any type of communication node.

Another embodiment of the disclosure provides a technique for mitigating the aforementioned two drawbacks of the virtual platform technique.

Another embodiment of the disclosure provides such a technique that is simple to implement and inexpensive.

Although the present disclosure has been described with reference to one or more examples, workers skilled in the art will recognize that changes may be made in form and detail without departing from the scope of the disclosure and/or the appended claims.

What is claimed is:

1. Method for transactional simulation of a generic communication node model included in a complex system model, said generic node model managing transactions between constituents of said complex system model, wherein said method comprises the following steps, performed by a computer at each simulation step corresponding to an event belonging to a group of events comprising transaction starts and transactions ends:
   calculating a remaining quantity of data to be transmitted for each uncompleted transaction present in a list of current transactions;
   if said simulation step corresponds to the start of a new transaction, calculating a quantity of data to be transmitted for the new transaction and adding the new transaction to the list of current transactions;
   if said simulation step corresponds to the end of a transaction, removing the transaction from the list of current transactions;
   allocating throughputs to the current transactions of the list of current transactions, according to a predetermined policy of sharing the generic node model;
   calculating the smallest duration TpsRk among durations each up to the end time of one of the current transactions: TpsRk=MIN(TpsRi), with TpsRi=Qri/Di, TpsRi being the duration up to the time of end of the current transaction i of the list of current transactions, Qri the quantity of data remaining for the transaction i and Di the throughput allocated to the current transaction i;
   assigning a wait for said duration TpsRk before the generation of the next end of transaction event.

2. Method according to claim 1, wherein the step of allocating throughputs to the current transactions comprises a direct throughput allocation step.

3. Method according to claim 1, wherein the step of allocating throughputs to the current transactions comprises a step of indirect throughput allocation comprising the following steps:
   allocation to the current transactions, according to said predetermined node sharing policy, percentages of a maximum throughput MaxThroughput of the generic node model;
   calculating the throughputs allocated to the current transactions by applying the following formula: Di=MaxThroughput * Ri, with Ri the percentage of the maximum throughput allocated to the current transaction i.

4. Method according to claim 1, wherein the predetermined node sharing policy belongs to the group comprising:
   a policy of allocation by egalitarian interleaving, such that all the values Di are equal to MaxThroughput/N, with MaxThroughput the maximum throughput of the generic node model and N the number of current transactions;
   a policy of allocation by priority, such that: Di=MaxThroughput for the transaction i with the highest priority, and: Di=0 for the other transactions;
   an allocation policy of the a "first in first out" type, such that: Di =MaxThroughput for the oldest transaction, and: Di=0 for the other transactions;
   an allocation policy of a quality of service type, such that each transaction i is associated with a priority Pi and a requested throughput RequestedThroughput_i, and, in order of decreasing priority, each current transaction i is allocated its requested throughput or the remaining throughput if it is less that its requested throughput.

5. Method according to claim 1, wherein said group of events also comprises modifications to a maximum throughput MaxThroughput of the generic node model.

6. Method according to claim 1, wherein said complex system comprises a complex electronic system.

7. Computer program product recorded on a non-transitory medium that can be read by computer, said computer program product comprising program code instructions for execution, when said program is executed on a computer, of a method for transactional simulation of a generic communication node model included in a complex system model, said generic node model managing transactions between constituents of said complex system model, wherein said method comprises the following steps, performed at each simulation step corresponding to an event belonging to a group of events comprising transaction starts and transactions ends:
   calculating a remaining quantity of data to be transmitted for each uncompleted transaction present in a list of current transactions;
   if said simulation step corresponds to the start of a new transaction, calculating a quantity of data to be transmitted for the new transaction and adding the new transaction to the list of current transactions;
   if said simulation step corresponds to the end of a transaction, removing the transaction from the list of current transactions;
   allocating throughputs to the current transactions of the list of current transactions, according to a predetermined policy of sharing the generic node model;
   calculating a the smallest duration TpsRk among durations each up to the end time of one of the current transactions: TpsRk=MIN(TpsRi), with TpsRi=Qri/Di, TpsRi being the duration up to the time of end of a the current transaction i of the list of current transactions, Qri the quantity of data remaining for the transaction i and Di the throughput allocated to the current transaction i;

assigning a wait for said duration TpsRk before the generation of the next end of transaction event.

8. A non-transitory storage medium able to be read by a computer, storing a set of instructions executable by said computer in order to implement a method for transactional simulation of a generic communication node model included in a complex system model, said generic node model managing transactions between constituents of said complex system model, wherein said method comprises the following steps, performed at each simulation step corresponding to an event belonging to a group of events comprising transaction starts and transactions ends:

calculating a remaining quantity of data to be transmitted for each uncompleted transaction present in a list of current transactions;

if said simulation step corresponds to the start of a new transaction, calculating a quantity of data to be transmitted for the new transaction and adding the new transaction to the list of current transactions;

if said simulation step corresponds to the end of a transaction, removing the transaction from the list of current transactions;

allocating throughputs to the current transactions of the list of current transactions, according to a predetermined policy of sharing the generic node model;

calculating the smallest duration TpsRk among durations each up to the end time of one of the current transactions: TpsRk=MIN(TpsRi), with TpsRi=Qri/Di, TpsRi being the duration up to the time of end of a current transaction i of the list of current transactions, Qri the quantity of data remaining for the transaction i and Di the throughput allocated to the current transaction i;

assigning a wait for said duration TpsRk before the generation of the next end of transaction event.

9. The non-transitory storage medium of claim 8, wherein the storage medium is at least partially removable.

10. The non-transitory storage medium of claim 9, wherein the storage medium is totally removable.

* * * * *